Feb. 6, 1940.   J. W. GREIG   2,189,396
ADJUSTABLE SEAT
Filed Oct. 10, 1936   5 Sheets-Sheet 1
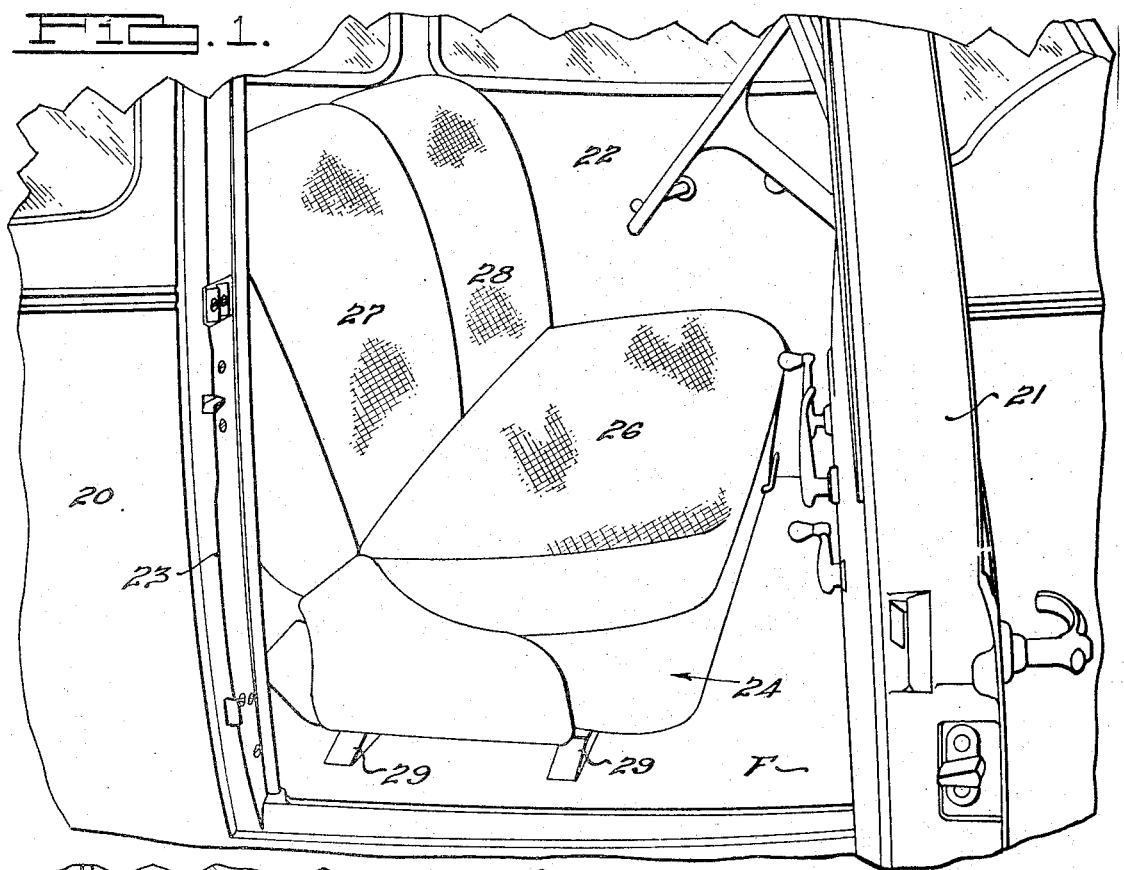
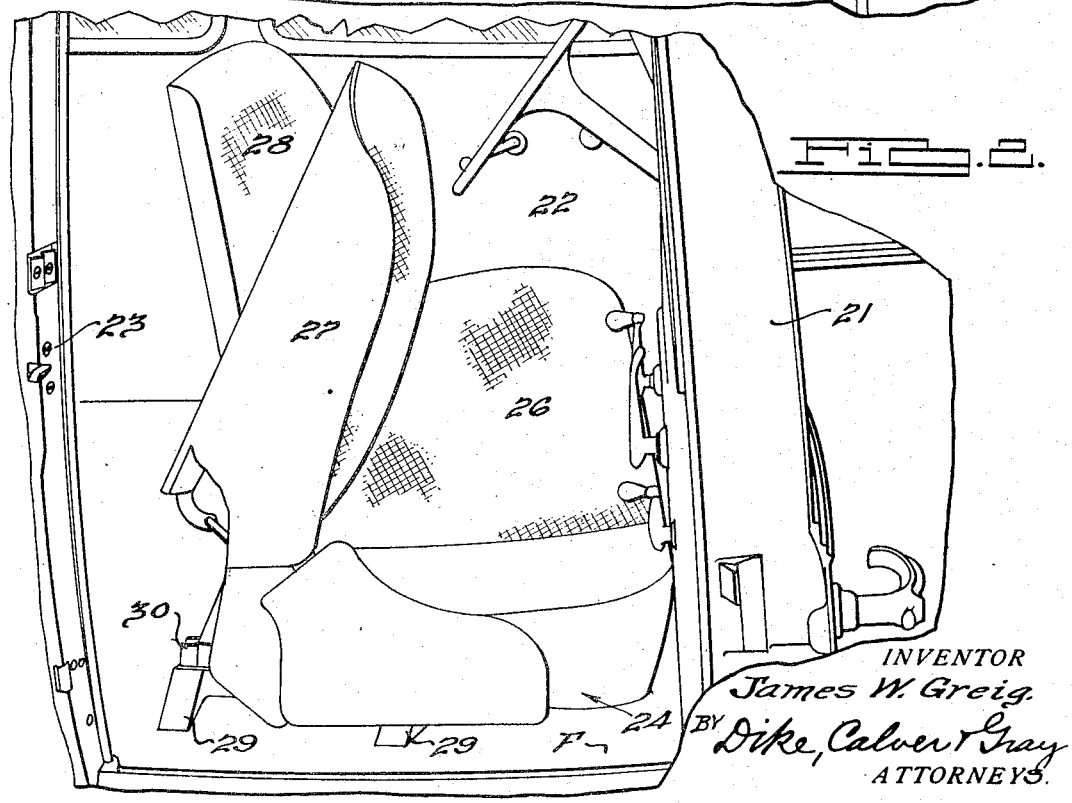
INVENTOR
James W. Greig.
BY Dike, Calvert & Gray
ATTORNEYS.

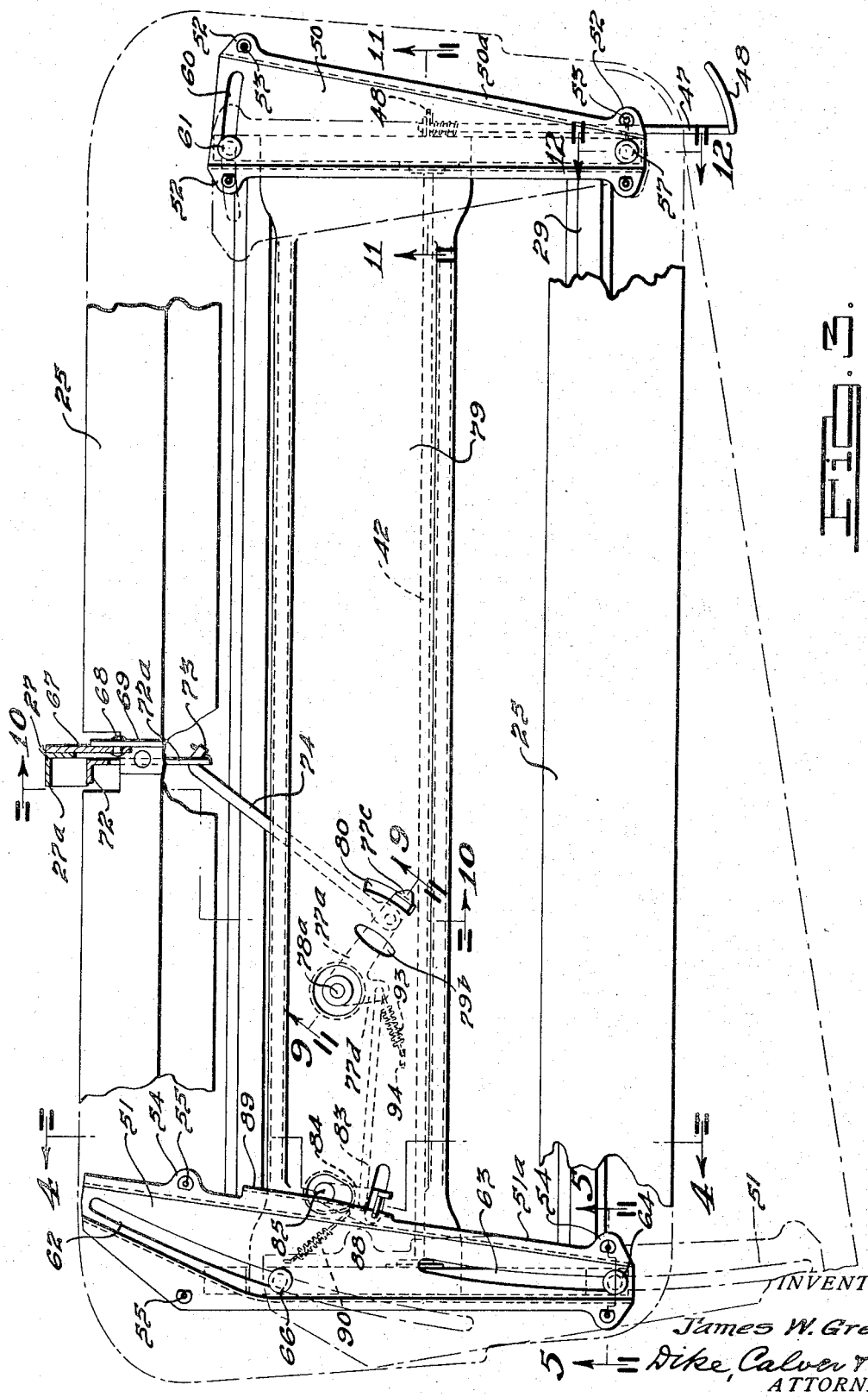

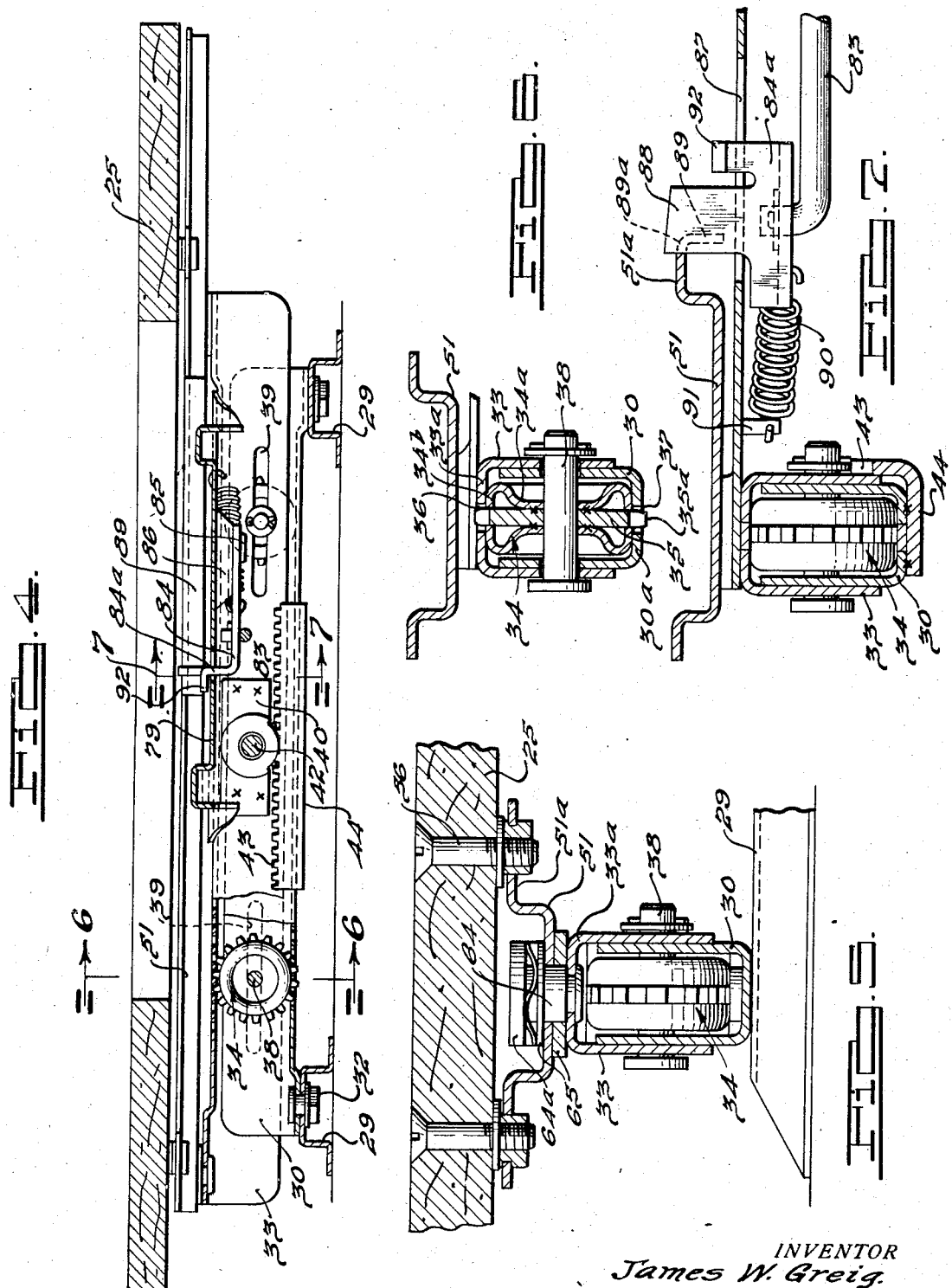

Feb. 6, 1940.   J. W. GREIG   2,189,396
ADJUSTABLE SEAT
Filed Oct. 10, 1936   5 Sheets-Sheet 4
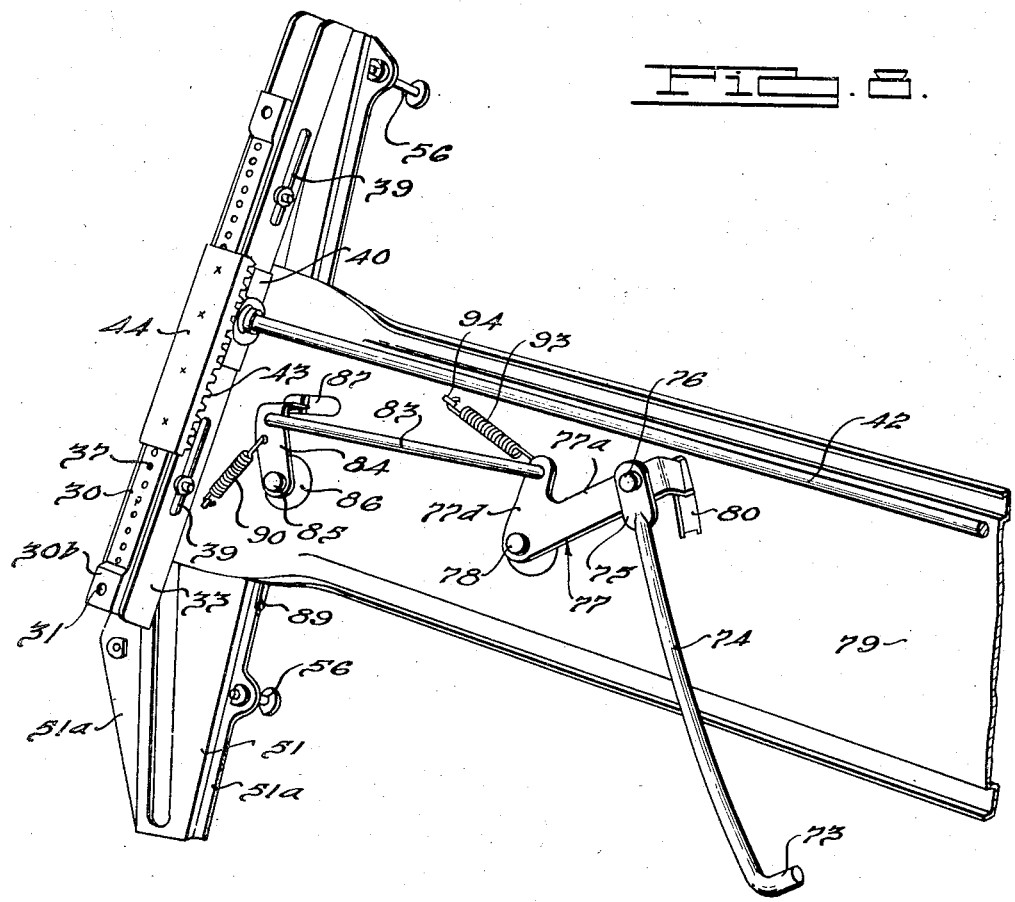
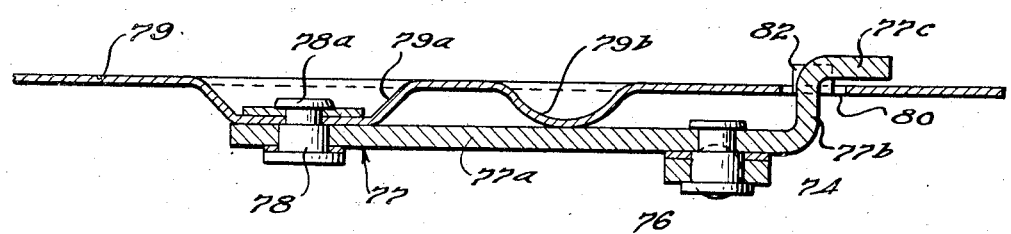
INVENTOR
James W. Greig.
BY Dike, Calver & Gray
ATTORNEYS.

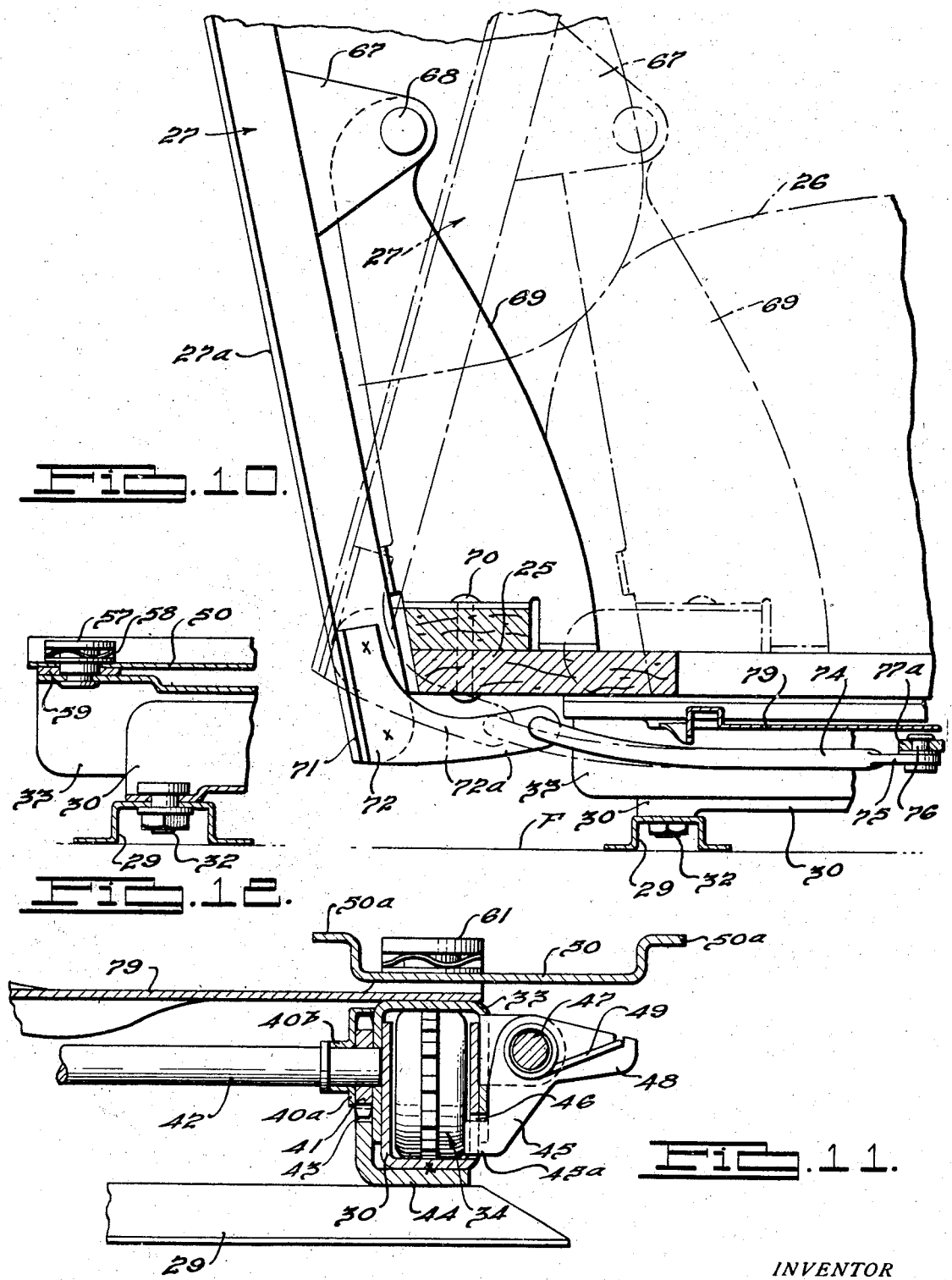

Patented Feb. 6, 1940

2,189,396

UNITED STATES PATENT OFFICE 2,189,396

ADJUSTABLE SEAT

James W. Greig, Grosse Pointe Park, Mich., assignor to Hudson Motor Car Company, Detroit, Mich., a corporation of Michigan Application October 10, 1936, Serial No. 104,990

3 Claims. (Cl. 155—5)

This invention relates to adjustable seats for vehicle bodies and particularly, although not exclusively, to front seats for automobile bodies of the type wherein it is desirable not only to adjust the seat for the convenience of the driver or front seat passenger but also to move the seat at predetermined times in order to permit a passenger using the rear seat of the car to enter or leave through the front door opening.

An object of the invention is to provide an improved adjustable seat structure for a vehicle body in which the seat is supported in such manner that it may be swung or partially rotated horizontally, or in substantially a horizontal plane, so as to move one end or a rear corner of the seat away from the adjacent edge of the door opening.

A further object of the invention is to provide a vehicle body seat which may be swung or turned horizontally about a pivot located adjacent one end or a front corner of the seat so as to dispose the opposite end of the seat in spaced relation to one of the body pillars.

Another object of the invention is to provide a vehicle body seat, particularly a front seat for an automobile body, which may be adjusted fore and aft or longitudinally of the vehicle and which also may be swung or turned in a horizontal direction in order to move one end of the seat away from the body pillar at the rear edge of the front door opening so as to provide a space permitting a rear seat passenger to enter or leave the car.

Still another object of the invention is to provide an adjustable seat which may be turned or swung in a horizontal direction in the manner or for the purposes above stated and in which such adjustment of the seat may be accomplished by shifting or swinging in a forward direction the upright back of the seat.

A further object is to provide a transverse front seat for an automobile body which may be adjusted longitudinally and which may also be swung in substantially a horizontal plane and in any longitudinal adjusted position of the seat simply by manipulating the seat back.

A further object is to provide an improved adjustable seat of the foregoing character in which latching means is provided for locking the seat against horizontal swinging movement, such latching means being controlled for release by the initial movement of the seat back thereby permitting the seat to be swung horizontally upon continued movement of the seat back.

Other objects of this invention will appear in the following description and appended claims, reference being had to the accompanying drawings forming a part of this specification wherein like reference characters designate corresponding parts in the several views.

Fig. 1 is a fragmentary side elevation of an automobile body illustrating a front seat mounted therein for adjustment in accordance with the present invention.

Fig. 2 is a similar view illustrating an adjusted position of the seat.

Fig. 3 is a plan view of the seat, parts being broken away and removed to show the adjusting mechanism.

Fig. 4 is an enlarged longitudinal vertical section taken through lines 4—4 of Fig. 3 in the direction of the arrows.

Fig. 5 is an enlarged fragmentary section taken through lines 5—5 of Fig. 3 in the direction of the arrows.

Fig. 6 is an enlarged section taken through lines 6—6 of Fig. 4 in the direction of the arrows.

Fig. 7 is an enlarged section taken through lines 7—7 of Fig. 4 in the direction of the arrows.

Fig. 8 is a fragmentary bottom perspective view of the supporting and adjusting mechanism for the seat.

Fig. 9 is an enlarged section taken through lines 9—9 of Fig. 3 in the direction of the arrows.

Fig. 10 is an enlarged vertical section taken through lines 10—10 of Fig. 3 in the direction of the arrows.

Fig. 11 is an enlarged section taken through lines 11—11 of Fig. 3 in the direction of the arrows.

Fig. 12 is a detail section taken through lines 12—12 of Fig. 3.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present invention is particularly useful in connection with automotive vehicles having bodies of the so-called coach and coupe types wherein it is desirable to mount the front seat so that it may be readily shifted into position to facilitate access to a rear seat and to enable a passenger using the rear seat to enter or leave through the front door opening. One preferred embodiment of the invention is, therefore, illustrated in connection with a coach body 20 having front doors 21 and 22 hinged, for example, to the front upright pillars of the body. One of the center upright pillars of the body is shown at 23 which forms with the front pillar a side door opening of predetermined width. Figs. 1 and 2. Opposite this side door opening and extending transversely of the body at the front thereof is a movable seat designated generally at 24 which comprises a unitary base frame 25 (Figs. 3, 4 and 10) having mounted and secured thereon preferably a single transversely extending spring seat cushion 26, this cushion being of a width to accommodate the driver of the vehicle and a passenger at his right. The seat 24 is also provided with individual spring cushion backs 27 and 28 of the bucket type.

Mounted on the floor F of the body and secured thereto are a pair of parallel transversely extending channels 29 providing base members for supporting the seat. Mounted upon these supporting channels near the opposite ends thereof are a pair of guide channels 30 which extend longitudinally of the vehicle, see especially Figs. 4, 5 and 8. Each guide channel 30, as shown in Fig. 8, is provided at opposite ends thereof with downwardly offset portions 30b having apertures 31 for the reception of bolts 32 by means of which, as shown in Figs. 4 and 10, the spaced parallel guide channels 30 are rigidly fastened to the floor members 29. Each channel 30 is mounted with its channel opening upwards and slidingly mounted on each of the guide channels 30 is an inverted channel member 33 having its depending side flanges embracing the upwardly extending side flanges of the channel 30, as illustrated in Figs. 5, 6 and 8. Interposed between each pair of cooperating channels 30 and 33 are a pair of roller elements generally designated at 34, the roller elements in each instance being mounted, as illustrated in Fig. 4, near opposite ends of the fixed guide channel 30, four of these rollers being thus provided in the present instance. Each roller element 34 may comprise a pair of similar sheet metal stampings centrally dished at 34a (see Fig. 6) and formed with outer inturned edge flanges 34b forming substantially flat bearing surfaces engageable with the opposite central webs 30a and 33a, respectively, of the channels 30 and 33. Interposed between the stamped sections of each roller is a gear 35 to which the dished or concaved portions 34a are spot welded, this gear having teeth 35a meshing in perforations 36 in the web 33a and perforations 37 in the web 30a. The composite roller 34, thus formed, is secured to a transverse spindle 38 freely rotatable in alined apertures in the upright side flanges of the channel 30 and extending through elongated slots 39 in the depending flanges of the channel 33, see Figs. 4, 6 and 8.

Spot welded to the inner depending flange of each of the channels 33 is a plate 40 (see Figs. 4, 8 and 11) pressed out to provide a housing 40a for a pinion 41 and also provided with a sleeve portion 40b adapted to receive one end of an equalizer shaft 42 extending transversely of the seat and connecting the channels 33 together. Each end of the shaft 42 is thus revolubly supported within the bearing 40b of the plate 40 and in a hole in the inner depending flange of the channel 33, as shown in Fig. 11. The pinions 41 are secured to the opposite ends of the shaft 42 and the teeth thereof cooperate with rack teeth 43 formed on a flanged edge of a plate 44 spot welded to the bottom of the channel 30, as shown in Figs. 4, 8 and 11.

It will be understood from the foregoing that the construction thus described provides a means by which the seat may be adjusted in a rectilinear direction forwardly and rearwardly or longitudinally of the vehicle. Any suitable latching means may be provided for locking the channels 30 and 33 together against relative sliding movement and releasable to permit relative adjustment thereof. Such latching means may take the form of an oscillatable latch 45 having a latch projection 45a cooperable with any one of a series of apertures 46 in the outer upright flange of one of the channels 30, preferably at the driver's end of the seat, as illustrated in Figs. 3 and 11. The latch 45 is secured to a rock shaft or spindle 47 journalled at one end in a bracket 48 fastened to the channel 33, the shaft extending forwardly and having a handle 48 by which it may be turned against the action of a spring 49 to disengage the latching projection 45a from the slot or aperture 46, the spring 49 functioning to move the latch into latching position in one of the apertures when the handle 48 is released.

As illustrated particularly in Figs. 3 and 8, the seat is mounted upon the longitudinally adjustable channels 33 for independent swinging movement in a horizontal plane, the connection between the seat and the slide channels 33, whereby this independent horizontal swinging adjustment of the seat is permitted, being accomplished through the medium of cam plates 50 and 51. These cam plates extend longitudinally of the vehicle and overlie the top horizontal webs of the channels 33, the plate 50 being positioned at the driver's end of the seat or, as herein illustrated, at the left hand side facing forwardly. It will be understood, of course, that the positions of the cam plates may be reversed where the steering wheel is located at the right hand side of the car. As illustrated in Figs. 3 and 11, the cam plate 50 is substantially channel shaped in cross section, the side edges of the plate being flanged up and formed with outturned flanges 50a. At the opposite ends of the cam plate 50 the flanges 50a terminate in ears 52 having apertures 53 to receive bolts or screws (not shown) by means of which the plate 50 is rigidly secured to the seat frame 25. The cam plate 51 in like manner is substantially channel shaped in cross section, the side edges of the central web thereof being bent up and thence turned out to provide oppositely extending flanges 51a, as seen in Figs. 5, 6 and 8. These flanges at opposite ends of the plate 51 are provided with ears or projecting portions 54 having apertures 55 for the reception of bolts or screws 56 by means of which the plate 51 is rigidly secured to the frame 25 of the seat. It will be understood that the cam plate 50 is secured to the seat frame by devices 56 in substantially the same manner as the plate 51 and as illustrated in Fig. 5.

Referring to Figs. 3 and 12 it will be seen that the forward end of the cam plate 50 is pivoted at a fixed point by means of a headed stud or rivet 57 to the upper horizontal web 33a of the sliding channel 33, anti-friction washers 58 and 59 being mounted on the stud at opposite faces of the plate 50. The plate 50 is flared in shape from the front towards the rear thereof and is provided at its rear end with an arcuate cam slot 60, the opposite edges of the cam slot being formed on concentric curves which have their center at the pivot 57. The underlying channel 33 beneath the cam plate 50 has secured thereto a stud 61 extending upwards through the cam slot 60 and having the head of the stud overlying the edges of the slot. Thus, the cam plate 50 may swing horizontally about an axis formed by the pivot 57, the rear swinging end of the plate being guided and controlled by the stud 61 lying within the guide slot 60.

The cam plate 51 at the opposite end of the seat is mounted to swing horizontally and bodily about the axis formed by the pivot 57. This plate has at its rear end an arcuate slot 62, the opposite parallel edges of which being formed on concentric curves having their center at the pivot 57. The forward end of the plate also has an arcuate slot 63 also formed on a curve whose center is at the pivot 57. As illustrated in Fig. 5, a stud 64 is riveted to the upper web 33a of the sliding channel 33, the shank of the stud projecting freely through the slot 63 and having its head 64a overlying the edges of the slot, anti-friction washers 65 being interposed between the head of the stud and the plate 51 and between the web 33a and the plate 51. A similar stud 66 is secured to the channel 33 in like manner and cooperates with the slot 62, the construction in this respect being the same as that illustrated in Fig. 5. Thus, it will be seen that since the seat 24 is secured to the cam plates 50 and 51 and since the latter are movably mounted on the slide channels 33, the entire seat may be swung horizontally about a single axis formed by the pivot 57. This swinging movement is permitted and is also controlled by virtue of the arcuate slots 60, 62 and 63 and the cooperating studs 61, 64 and 66, the slots all being formed so as to have a common center at the pivot 57.

The seat 24 may be swung in a horizontal plane about the axis 57 simply by manipulating the swinging back 27 as illustrated in Figs. 1 and 2. Referring to Figs. 3 and 10, the cushion back 27 comprises an upholstered frame provided at its inner side with a depending leg in the form of an angle bar 27a. Fixed to the angle bar 27a adjacent the base of the back cushion is a forwardly projecting bracket 67 pivoted at 68 to a depending arm 69 rigidly secured at its base to the seat frame 25 through the medium of bolts 70. The angle bar 27a has a depending leg or extension 71 projecting somewhat below the seat frame 25, and secured as by spot welding to this leg is an angle bracket 72 having a forwardly projecting arm 72a provided with an aperture to receive the bent or hooked end 73 of a movable link 74 (see Figs. 3, 8 and 10). The hooked end 73 of the link has a loose fit in the aperture at the end of the arm 72a and is held against disconnection by a cotter pin. The link 74 projects forwardly beneath the seat frame (Fig. 10) and has a flat extension 75 pivoted at 76 to the long arm 77a of a bell crank lever 77. This lever is pivoted through a stud 78 riveted at 78a (Figs. 8 and 9) to a transverse tie plate or stringer 79 rigidly connected as by spot welding at opposite ends to the upper horizontal webs 33a of the slide channels 33. The free end of the arm 77a of the bell crank lever is upwardly offset at 77b to extend through a slot 80 in the plate 79, the end of the lever arm having an outwardly bent tongue 77c overlying the upper edge of the slot. The metal at the end of the slot is struck up to provide a stop member 82. It will be seen from Fig. 9 that the pivot 78 is secured to a depressed or embossed portion 79a of the plate 79 thereby spacing the lever 77 from the supporting plate, a further embossment 79b being provided in the plate and engaging the arm 77a to act as a bearing to hold the arm in proper position. The shorter arm 77d of the bell crank lever 77 is pivotally connected to a link 83 which extends laterally therefrom, as shown in Figs. 3 and 8, and is pivotally connected to an oscillatable latch member 84. The latch member 84 is pivoted to a stud 85 secured to a depressed or embossed portion 86 of the plate 79 (Figs. 4 and 8). The opposite end of the latch member 84 is bent up at 84a to extend freely through a slot 87 in the plate 79 and this bent portion is provided with a latching projection 88 extending edgewise with respect to a depending flange 89 formed along the inner edge of the flange 51a of the cam plate 51 (see Figs. 3, 7 and 8). This flange 89 is provided with a notch 89a into which the latching projection or dog 88 is urged through the medium of a spring 90. One end of this spring is hooked into an aperture in the latch member 84 and the other end is anchored at 91 to a stud on the bottom of the supporting plate 79. The upwardly bent portion 84a of the latch member 84 is also provided with an angular tongue 92 which overlies one edge of the slot 87, thereby interlocking the latch member and plate to prevent displacement of the latch. A tension spring 93 is connected at one end to the free end of the arm 77d of the bell crank lever, the opposite end of the spring being anchored at 94 to the bottom of the plate 79 (Fig. 8). This spring resists swinging movement of the bell crank lever and normally tends to urge the lever into the position shown in Fig. 8. Thus, with the parts in the positions illustrated in Figs. 3, 7 and 8 and with the latch projection 88 extending into the notch 89a, it will be seen that the cam plate 51 is thereby latched to the transverse tie plate 79 which connects together the slide channels 33. Hence, in this position of the parts the seat is locked against horizontal swinging movement about the axis formed by the pivot 57, although the seat is at the same time adjustable longitudinally upon disengaging the latch projection 45 through manipulation of the handle 48.

From the foregoing it will be seen that I have provided an improved adjustable seat 24 which is pivoted at a point 57 adjacent one end of the seat and preferably, as herein illustrated, adjacent a front corner of the seat, the improved construction being such that upon swinging in a forward direction the individual seat back 27 at the opposite end of the seat the latter may be partially rotated or swung in substantially a horizontal plane about the vertical axis formed by the pivot 57. As a consequence of this adjustment of the seat, reference being had particularly to Figs. 1 and 2, the end of the seat opposite the pivoted end thereof may be swung in an arc away from the body pillar 23 at the rear upright edge of the front door opening, thereby providing adequate space for a passenger using the rear seat to enter or leave the car through the front door opening. It is preferred that the pivot 57 be located at or near the front corner of the seat at the end thereof occupied by the driver, this for the reason that a maximum adjustment of the opposite end or opposite rear corner of the seat is possible, as illustrated in dotted lines in Fig. 3. An additional advantage is achieved by reason of this method of adjusting the seat. It will be seen that upon swinging the left-hand rear corner of the seat forwardly, looking at Fig. 3, the opposite rear corner of the seat will also be swung inwardly on an arc away from the body pillar at the opposite side of the body from the pillar 23, thereby providing space for a passenger to leave or enter the car by the door 22 even when the driver is occupying the front seat.

It will also be seen from the foregoing description of the illustrated embodiment of the invention that the lower end of the seat back 27 through the medium of the leg and bracket extensions 71 and 72 is fulcrumed at its connection 73 with the control rod 74 and is also pivotally connected at 68 to the seat 26 at a point above this fulcrum. By reason of the connection of the rod 74 with the arm 77a of the bell crank lever 77, and the lost motion slot 80, the fulcrum 73 has a limited arcuate movement. Thus, when the seat back 27 is swung forwardly, as shown in Figs. 2 and 10, the initial movement of the seat back will move the fulcrum, swing the bell crank lever 77 and withdraw the latch projection 88 from latching engagement in the notch 89a, thereby releasing the seat for swinging movement. Continued sequential movement of the seat back 27 forwardly will then result in swinging the seat about the pivot 57 since at this time the seat back no longer fulcrums and, therefore, shifts the end of the seat in a forward arcuate direction through the connection 68 and the arm 69 fixed to the seat frame. Since the guide slots 60, 62 and 63 are arcuate in formation and are formed on curves having their center at the pivot 57, the seat will be guided in the proper curvilinear path.

A further feature of the present invention resides in the fact that the seat 26 may at all times be adjusted fore and aft, or in a longitudinal direction, after first releasing the latch projection 45 by manipulating the handle 48, the preferred construction being such that the swinging of the seat in a horizontal direction can be accomplished in any longitudinal adjusted position of the seat. Thus, the seat 26 may be adjusted fore and aft to any desired position for the convenience of the driver or passenger and latched in such position, and while in such longitudinal adjusted position the seat may also be swung or turned in a substantially horizontal plane simply by shifting the seat back 27 forwardly.

I claim:

1. A seat structure for a vehicle body, comprising a pair of seat supporting channels, a transversely extending tie plate securing said channels together, a seat having a tiltable back section, two base plates secured to said seat along the sides thereof, a pivotal connection between one of said base plates and one of said channels whereby said seat is adapted to swing in a substantially horizontal plane around said pivotal connection, latch means mounted on said tie plate and adapted to engage one of said base plates and to lock said seat in a position substantially perpendicular to the vehicle body, and a release mechanism operated by said tiltable back section and adapted to unlock said latch means.

2. A seat structure for a vehicle body, comprising a pair of seat supporting channels, a transversely extending tie plate securing said channels together, a seat having a tiltable back section, two base plates secured to said seat along the sides thereof, a pivotal connection between one of said base plates and one of said channels adjacent one of the corners of said seat, whereby said seat is adapted to swing around one of its corners at said pivotal connection, a plurality of studs fixed on said channels and engaging a corresponding plurality of slots in said base plates limiting the swinging stroke of said seat, latch means mounted on said tie plate and having a member adapted to engage positively one of said base plates to lock said seat in a position substantially perpendicular to the vehicle body, and release mechanism operated by said tiltable back section, when the latter is swung forwardly, to unlock said latch means.

3. A seat structure for a vehicle body, comprising a pair of inverted seat supporting channels, a transversely extending tie member securing said inverted channels together, a seat having a tiltable back section, two plates secured to said seat along the sides thereof, a pivotal connection between one of said plates and one of said inverted channels adjacent one of the corners of said seat, whereby said seat is adapted to swing around one of its corners at said pivotal connection, a plurality of studs fixed on said inverted channels and engaging a corresponding plurality of slots in said plates limiting the swinging stroke of said seat, latch means mounted on said tie member and having a device adapted to engage positively one of said plates to lock said seat in a position substantially perpendicular to the vehicle body, and release mechanism operated by said tiltable back section to unlock said latch means when the back section is swung forwardly to cause the seat to swing about its pivotal connection, and spring means adapted to return said latch member into its locking position when the seat is returned into its original position.

JAMES W. GREIG.